(12) United States Patent
Hawkins

(10) Patent No.: US 6,980,730 B2
(45) Date of Patent: Dec. 27, 2005

(54) SYSTEM AND METHOD FOR PROCESSING A PROGRAM ALREADY IN PROGRESS

(75) Inventor: Bret David Hawkins, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1078 days.

(21) Appl. No.: 09/775,395

(22) Filed: Feb. 1, 2001

(65) Prior Publication Data

US 2002/0102094 A1     Aug. 1, 2002

(51) Int. Cl.⁷ .............................................. H04N 5/91
(52) U.S. Cl. ........................................ 386/46; 386/83
(58) Field of Search ............................ 386/46, 83, 95; 725/57, 58

(56) References Cited

U.S. PATENT DOCUMENTS 5,543,933 A  *  8/1996  Kang et al. .................... 386/83
5,758,009 A  *  5/1998  Hashimoto et al. ............ 386/83
6,173,112 B1 *  1/2001  Gruse et al. ................... 386/83
6,311,011 B1 * 10/2001  Kuroda ......................... 386/46

FOREIGN PATENT DOCUMENTS

| EP | 0774868 A1 | * | 5/1997 |
| EP | 0774868 B1 |   | 5/1997 |
| WO | WO0059214 A1 |   | 10/2000 |

* cited by examiner

Primary Examiner—Huy Nguyen
(74) Attorney, Agent, or Firm—Joseph S. Tripoli; Robert D. Shedd; Reitseng Lin

(57) ABSTRACT

A system and method for processing program data are presented. Program data are received. A selection of a program is received. A request for recording of the selected program is also received. A determination is then made to see whether the selected program is already in progress, and if the selected program is already in progress, a choice is then provided to record a later occurrence of the selected program so that the entire selected program may be recorded.

15 Claims, 8 Drawing Sheets

Fig. 1a
Fig. 1b
Fig. 1c

| TITLE | TOPIC | THEME | KEYWORD | ACTION | TIME |
|---|---|---|---|---|---|
| Star Trek | | | | remind | always |
| The Shining | | | | record | always |
| | movie | drama | | report | now |
| | | | robot | remind | always |
| | | | | | |

Fig. 5

SYSTEM AND METHOD FOR PROCESSING A PROGRAM ALREADY IN PROGRESS

FIELD OF THE INVENTION

The subject invention concerns a method and an apparatus for scheduling the selection of a program, for example, a television program for watching or recording when the selected television program is already in progress.

BACKGROUND OF THE INVENTION

The programming of modern television systems, such as TV schedulers, VCRs, and Satellite Receivers has become more complicated in that the number of available channels has increased dramatically of late. For example RCA® DSS® direct broadcast satellite receivers provide as many as 200 channels to choose from. Heretofore, a user who wanted to record a specific non-regularly scheduled television program such as the airing of a particular movie, would regularly consult a television schedule printed in his local newspaper in the hope that he would eventually find that movie listed.

Such a practice may work well when there are only a few television channel schedules to examine, however, it is unlikely that a viewer would be able to examine the complete schedules for 150 television channels each week. Such a task would be daunting even if all of the movies were to be listed separately, as some television program listings do. Consequently, it is felt that as the number of channels increases, the chances of successfully locating a single occurrence of a program (like a needle in a haystack) becomes more and more unlikely.

For recording of a selected program, there is a feature commonly known as "one touch recording." With this feature, a user may select a program from for example, a channel guide, and the device housing the channel guide will then send the necessary IR codes to program an associated VCR for recording, through for example, an IR blaster.

SUMMARY OF THE INVENTION

The present inventors recognize that there is a program with the previously mentioned one-touch recording feature, when the program selected for recording is already in progress. Specifically, the existing one-touch recording feature will merely record the reminding portion of the program, if the selected program is already in progress. Therefore, the user will then miss a portion of his or her favorite movie or show, etc.

Therefore, the present inventors recognize the desirability of solving these problems, especially in light of the popularity of the channel guide, which gives information about the availability of future programs. Hence, a system and method is presented, and in one exemplary embodiment, comprising the steps of:
 receiving program data;
 receiving selection of a program;
 receiving request for recording of the selected program; and
 determining whether the selected program is already in progress, and if the selected program is already in progress, providing a choice to record a later occurrence of the selected program so that the entire selected program may be recorded.

In another exemplary embodiment, a method is presented, comprising the steps of:
 receiving a user request;
 performing a search of said program data for a match to said user entered request;
 determining, if a matched program is found, whether said found program is in progress; and
 if said found program is already in progress, offering to record a later occurrence of the found program so that the entire found program may be recorded.

The apparatus or method can also notify the viewer by on-screen display or other means of the availability of the program. In those instances where descriptive text accompanies the program listing, apparatus of the invention performs a search of the text for a particular text string which may relate to the title, the star, the director, or the context of the program, among other search criteria.

BRIEF DESCRIPTION OF THE DRAWING

FIGS. 1a–1c are illustrations of a screen display of a portion of a channel guide, in accordance with one aspect of the invention.

FIG. 5 is an illustration of a search request list in accordance with the subject invention.

DETAILED DESCRIPTION OF THE INVENTION

Television systems such as the RCA® DSS® direct broadcast satellite system and Starsight® transmit channel guides for display on the television receivers of subscribers.

Figures 1A, 1B, 1C:
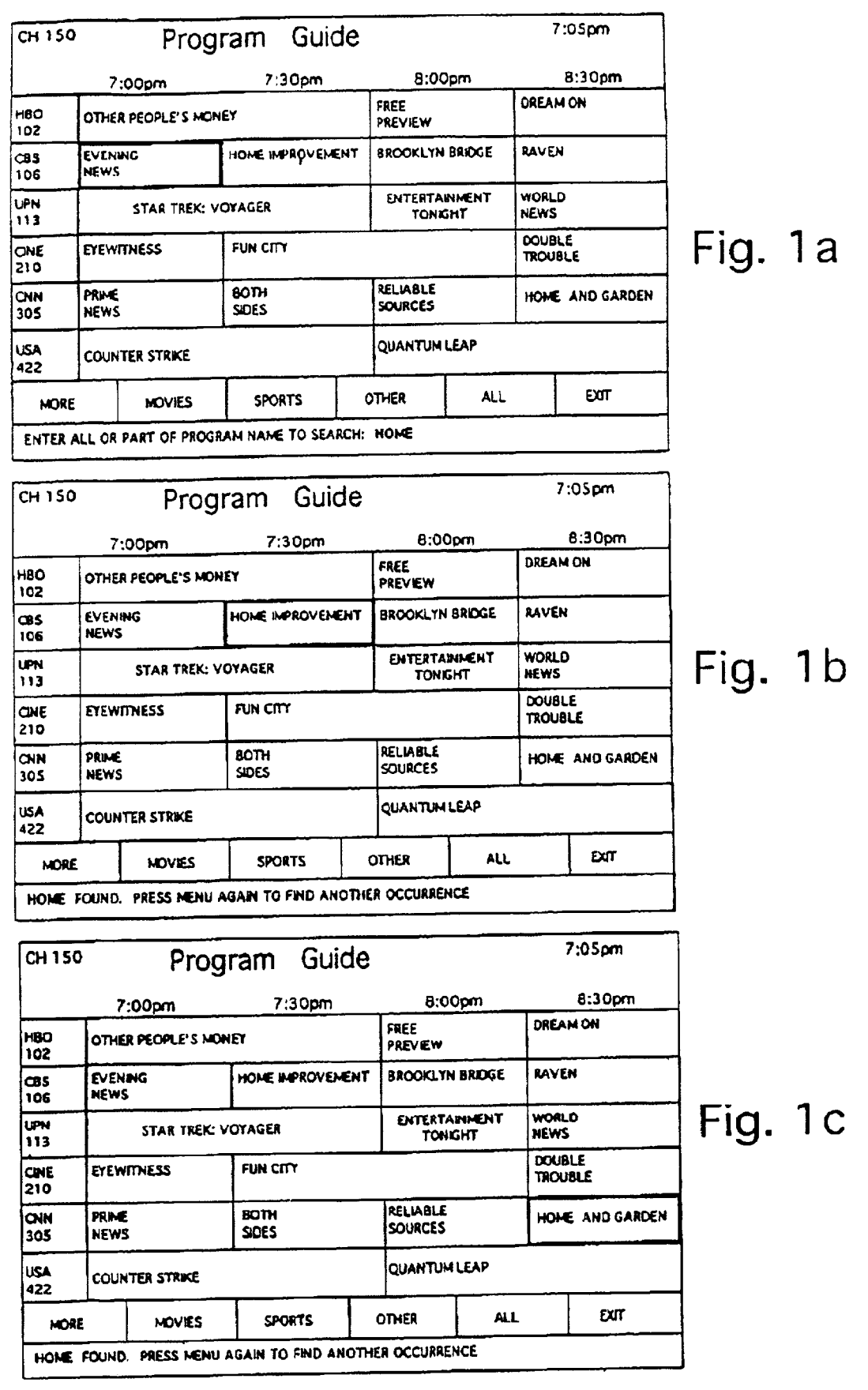

FIGS. 1a–1c show Program Guide screen displays produced, for example, by an RCA® DSS® direct broadcast satellite receiver system, manufactured by Thomson Consumer Electronics, Inc. Indianapolis, Ind. A user selects a television program from a Program Guide for viewing, by moving a cursor (via operation of remote control up, down, right, and left, direction control keys, not shown) to a block of the program guide screen display which contains the name of the desired program. When a SELECT key on the remote control is pressed, the current x and y position of the cursor is evaluated to derive virtual channel and program time information. In this example of FIG. 1a, a particular television show, EVENING NEWS has been highlighted for selection by use of the cursor keys on a remote control unit (e.g., 450R of FIG. 4). The highlighting is illustrated by the dark box outlining the title in FIGS. 1a–1c. Normally, upon pressing the SELECT key, the relevant programming data is transferred to a programming unit.

However, note the phrase "ENTER ALL OR PART OF A PROGRAM NAME TO SEARCH" which appears at the bottom of FIG. 1a. In this case the word "HOME" has been entered by a user. Upon pressing the MENU key, a search of the channel guide information is performed for the next occurrence of a television program including the word "HOME" in its title. At the completion of the search, the screen display of FIG. 1b is generated. Note that a television program on channel 106 entitled "HOME IMPROVEMENT" is now highlighted. If desired, a further search can be initiated by pressing the MENU key again. The result of that further search is shown in the screen display of FIG. 1c. Note that in FIG. 1c, a television program on channel 305, "HOME AND GARDEN" is highlighted, because that title includes the word "HOME", and thus satisfies the search criteria. The subject apparatus can also perform "substring searching" wherein the keyword (search term) is contained within another word. For example, a substring search on the word HOME would find the movie title "HOMEWARD BOUND". Similarly, the search can be made case sensitive, or case insensitive, as desired.

Figure 2:
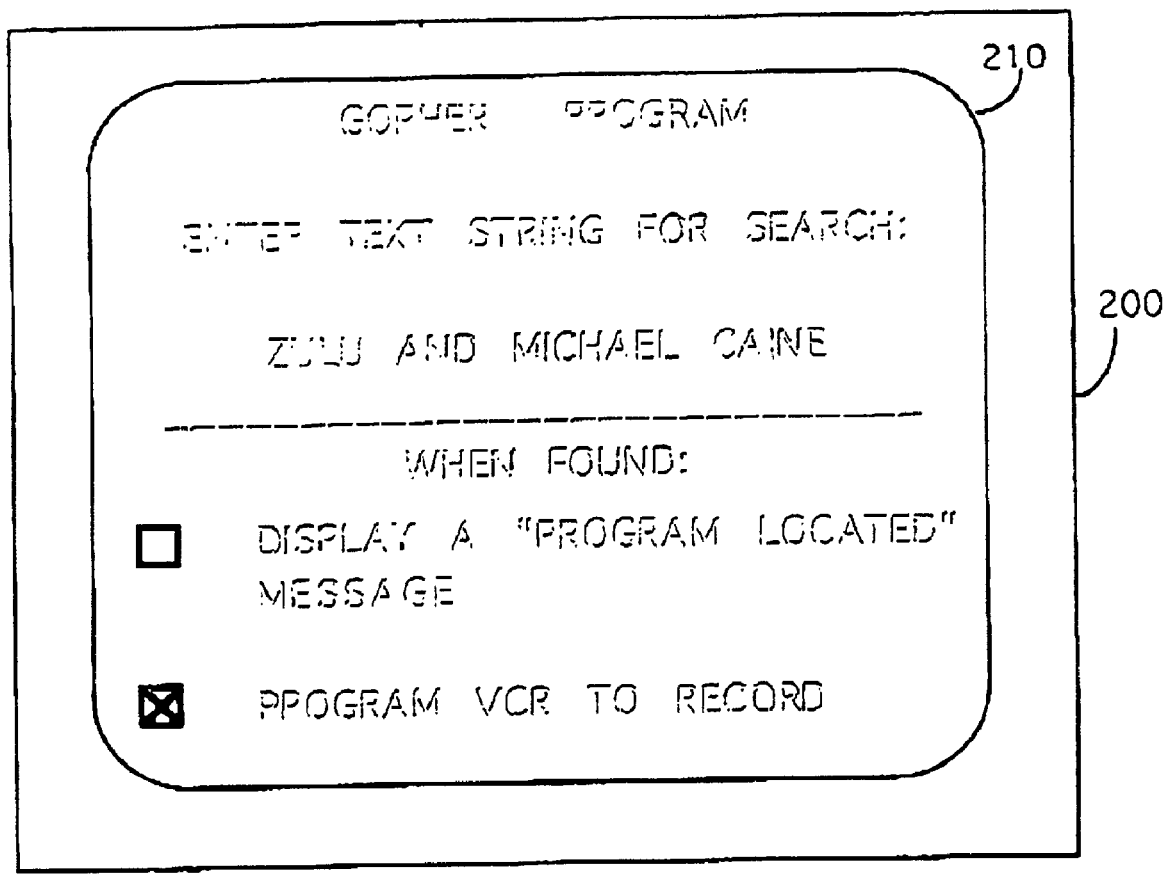
FIG. 2 is an illustration of a screen display showing a search request screen in accordance with another aspect of the invention.

FIG. 2 shows a "GOPHER PROGRAM" screen display 210 useful for entering text to be searched, and for entering instructions to be executed in the event that the search is terminated. The search entered on screen display 210 will perform the logical "AND" function on the search terms "ZULU" (a movie title) and "MICHAEL CAINE" (one of ZULU'S stars). While a logical "AND" function is shown, logical "OR" and "NOT" functions are also envisioned. In fact, a logical "OR" function could simply be performed by entering the search terms as two different searches. That is, if the search term "ZULU" were entered by itself, the movie "ZULU" AND any television program concerning the ZULU tribe would be selected. If the search term "MICHAEL CAINE" were entered as a separate search, the movie "ZULU" and any other movie starring Michael Caine would be selected.

Note from screen display 210, that when the movie "ZULU" is found, it is to be recorded. That is, after entering the search terms and instructions via screen display 210, the user does not have to perform any further function (other than ensuring that the VCR has a tape in it) to secure a recording of the movie "ZULU" whenever it is aired. At the proper time the apparatus of the invention will transmit the record commands to the VCR, automatically, through an IR transmitter 418R, shown in FIG. 4. Alternatively, the user may have checked the box labeled DISPLAY A "PROGRAM LOCATED" MESSAGE, in which case the show will not be recorded, but rather a reminder will be displayed on-screen indicating that the search has successfully terminated upon finding the requested item.

In addition, the user may highlight and select a program from program guide directly, as shown, for example, in FIG. 1b. Once a program such as "home improvement" is selected, the user may press a "record" key, for example, on the remote control 450R shown in FIG. 4 to record the program.

Figure 2A:
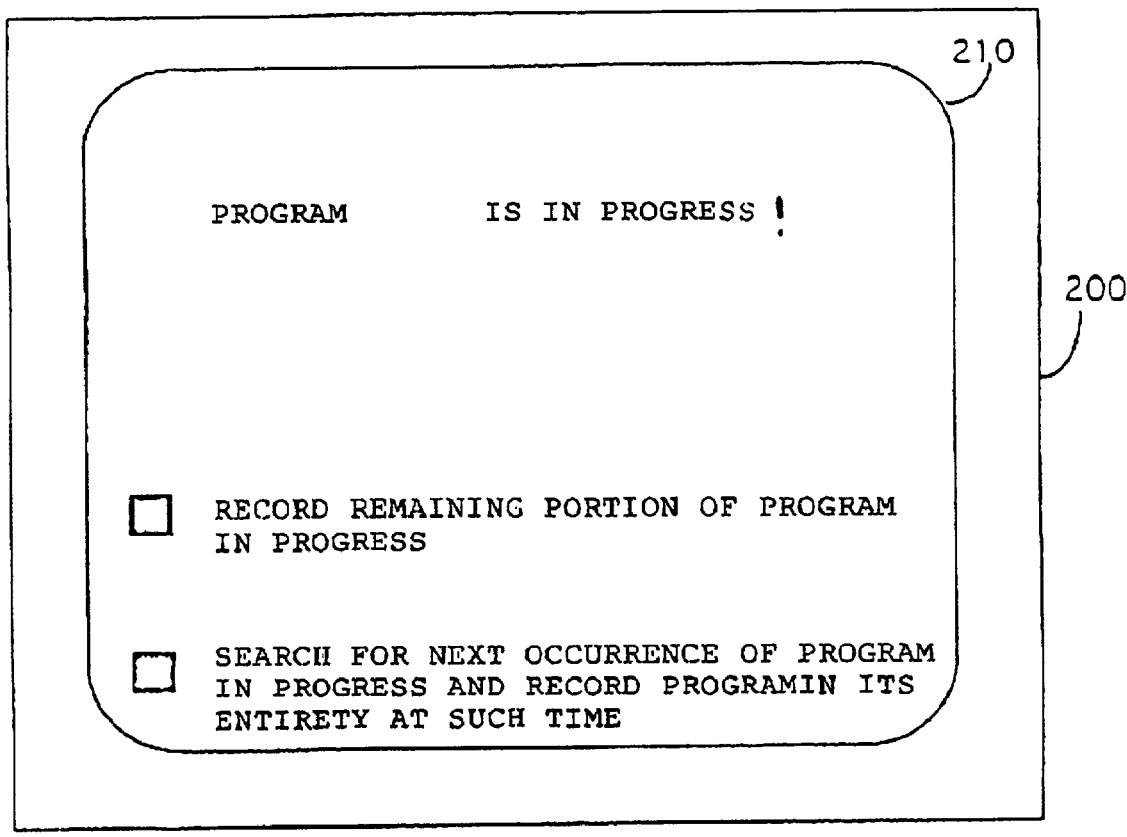
FIG. 2A is an illustration of a screen display offering a user a choice of program recording options in accordance with another aspect of the invention.

In either case, if the desired program is already in progress, then, as shown in FIG. 2A, the apparatus will offer the user via the on-screen display the option of either recording the remaining portion of the program then being broadcast, or searching for the next occurrence, i.e., broadcast, of the program and recording the program in its entirety at such time.

Figure 3:
FIG. 3 is an illustration of a screen display of a portion of a channel guide showing auxiliary program information.

FIG. 3 shows a Program Guide screen 310, including an auxiliary information display 320. The text of auxiliary display 320 includes the search terms "ZULU" and "MICHAEL CAINE" in the program description. This text will be searched by the GOPHER PROGRAM and the search will come to a successful conclusion. Note that a search of "ZULU" and "STANLEY BAKER" would have been equally successful. It is important to note that not only is the Program Guide text, but also the auxiliary information associated with the television programs, is being searched.

Figure 4:
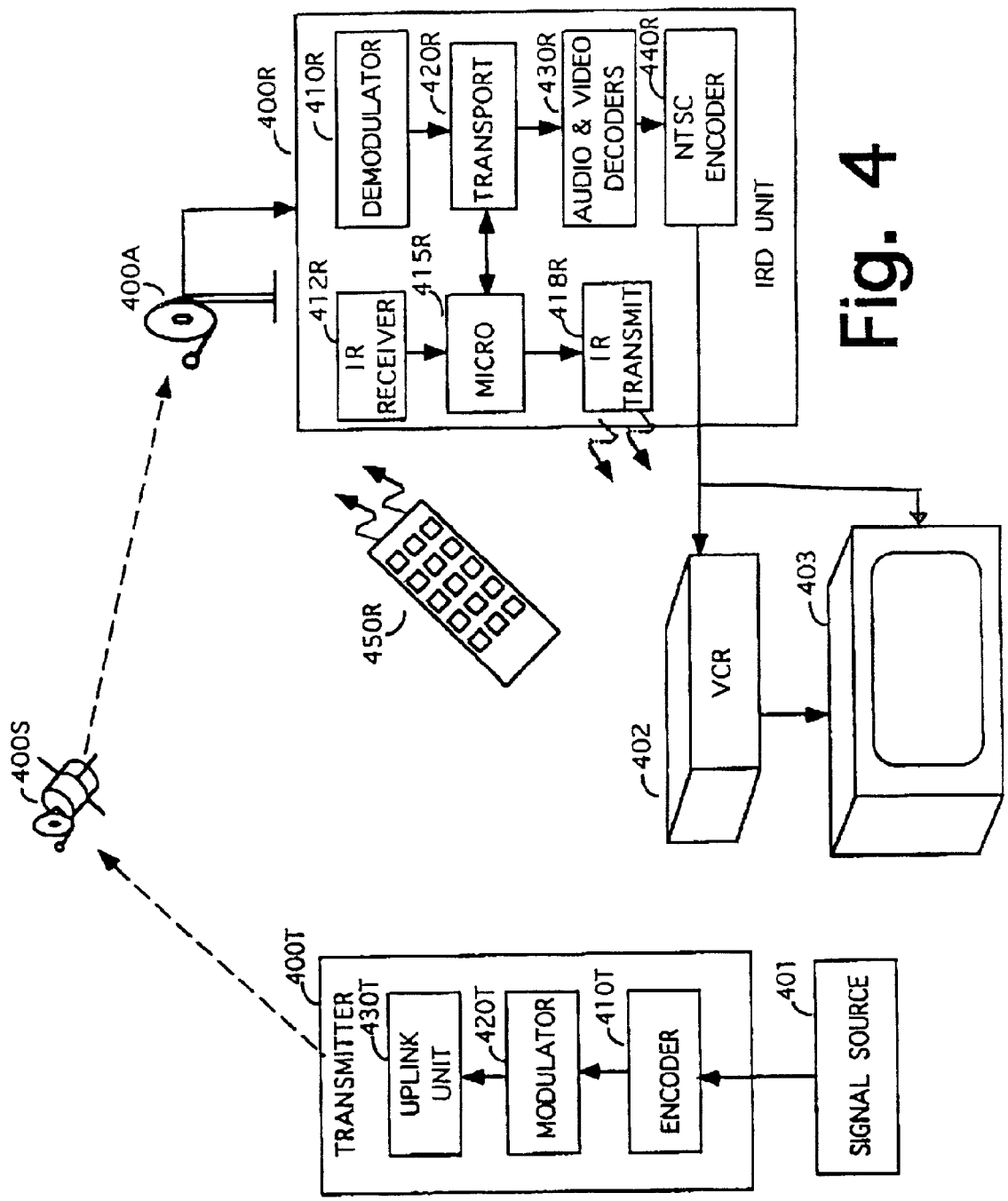
FIG. 4 is an illustration in block diagram form of apparatus suitable for use with the invention.

As noted above, the channel guide data used by the controller of the subject apparatus to form the above-described interactive or confirmation sentences may be received from a satellite television communication system. FIG. 4 shows such a satellite television communication system in which, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence.

In such a satellite system, the information necessary to select a given television program is not fixedly-programmed into each receiver but rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because the receiver (IRD, or Integrated Receiver Decoder) literally does not know where any channel is located, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 41 OR to demodulate the signal and to decode the error correction data, an IR receiver 412 for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 to record a program via an IR link 418R. Microprocessor 415R also generates the on-screen display signals needed for presenting the interactive sentence, or confirmation sentence, to the user. Microprocessor 415R also offers users via the on-screen display the choice of either recording the remaining portion of the program then being broadcast, or searching for the next occurrence of the program and recording the program in its entirety at such time, in accordance with the principles of the present invention. Microprocessor 415R also receives and interprets cursor key X and Y information in order to control the highlighting of user choices in the on-screen displays.

FIG. 5 shows a search request list which may be displayed as a screen display. In this embodiment of the invention, at least three exemplary actions are possible. First, as noted above, a show may be programmed to be recorded at its next airing without further intervention by the user. Second, as noted above, a reminder can be displayed on-screen that the requested program has been found. Third, a report listing various programs meeting the search criteria and airing in the immediate future (for example, the next three hours) can be prepared and displayed.

In the example of FIG. 5, the user has requested that he be reminded anytime an episode of Star Trek appears in the Program Guide. The user has also requested that the movie "The Shining" be recorded the next time it is found in the guide. The user has also requested that he be reminded anytime the word "robot" appears in the guide or in the program descriptions of the guide. These instructions will run until turned off by the user.

The remaining search (i.e., movie, drama, now) is a request which indicates that the user wants to know which dramas are being aired in the immediate future (i.e., within the next three hours). The controller will prepare a report listing all dramatic movies on all channels which are being broadcast in the next few hours. After doing so, this entry will be automatically deleted. It is further envisioned that a user may review and edit or delete search terms in order to modify on-going searches.

Figure 6:
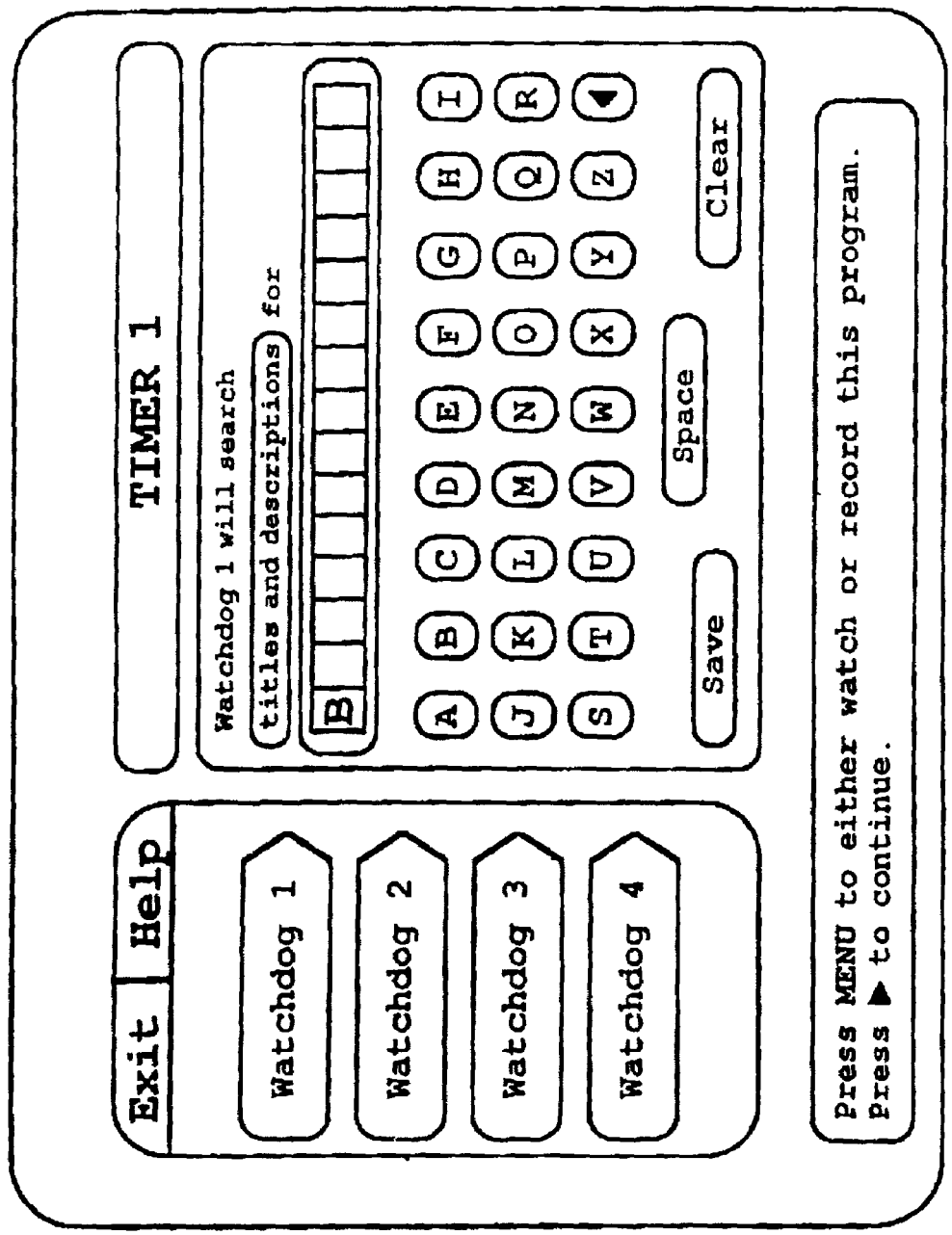
FIG. 6 is an illustration of a screen display useful for entering text search phrases in accordance with the invention.

FIG. 6 shows a screen display of a "virtual keyboard" useful for entering search data instructions, such as: record a program already in progress; search for the next occurrence of a program in progress and record it in its entirety at such time; or send a reminder. Four "Search Gophers" called "Watchdogs" are programmable for performing simultaneous searches of the Program Guide and auxiliary information data streams. By using the CURSOR and SELECT keys, a user can "press" one of the watchdog buttons on the left of the screen to select it. He may then use the alphabet keys to enter his search request. (While not explicitly shown, alphanumeric keys are also envisioned). When the user is satisfied with the text of his search request, he may press the Save key to save the search terms for this watchdog search process. If he makes an error, he may delete the error with the CLEAR key.

Figure 7:
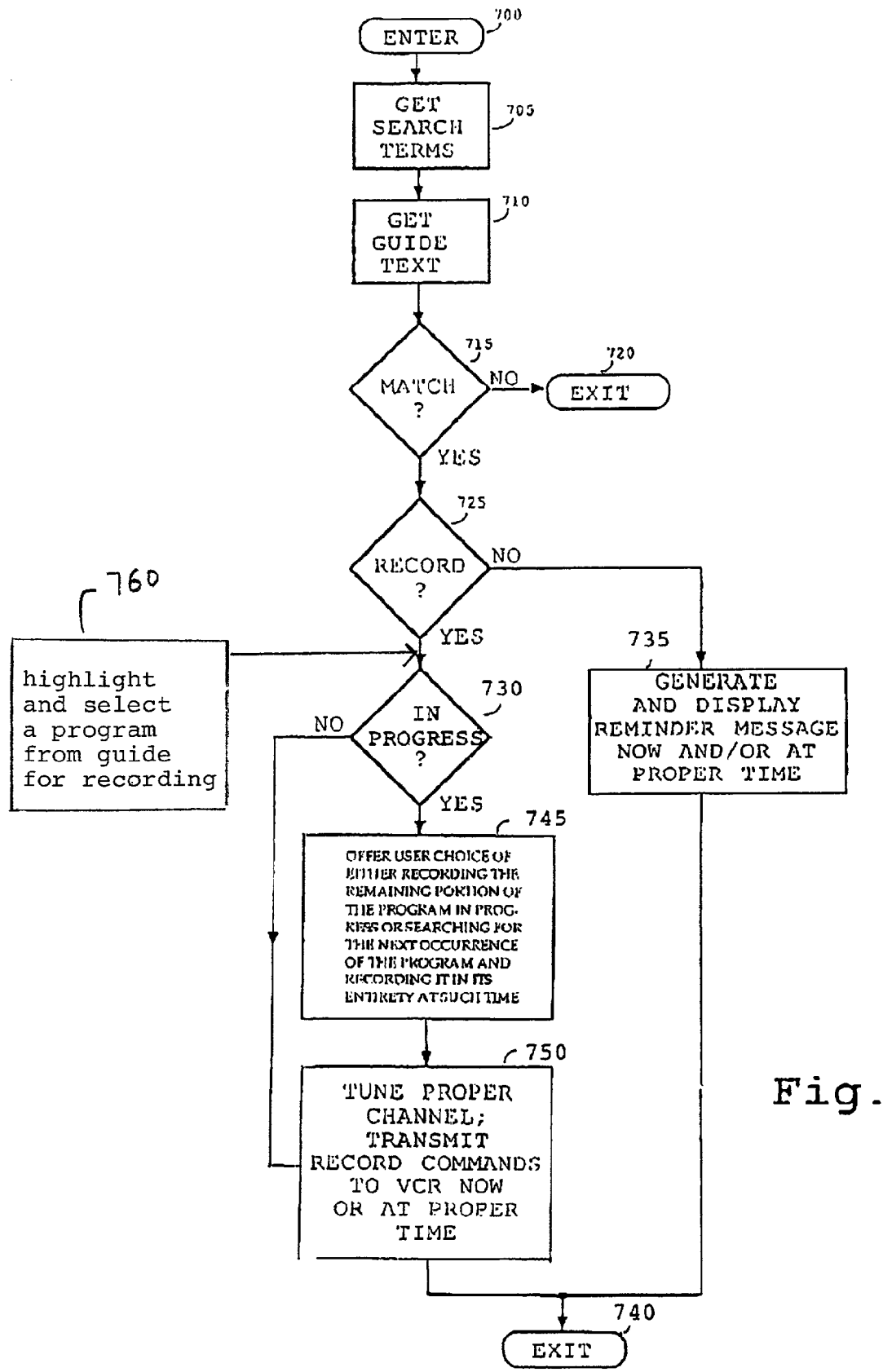
FIG. 7 is a flowchart useful in understanding the invention.

The Gopher program is entered at step 700 of FIG. 7. At step 705, the search terms are retrieved. At step 710, the Program Guide data is acquired. At step 715 a comparison is made to see if a match exists. If not the program is exited at step 720. If a match does exist, then the user-entered instructions are retrieved. A check is made at step 725 to determine if a record instruction has been entered. If a record instruction has been entered, the routine advances to step 730 to determine whether the program to be recorded is in progress. If a record instruction has not been entered, then the routine advances to step 735 at which a reminder message is generated for display on-screen or by other means, e.g., e-mail, either immediately or at an appropriate later time as a "last minute reminder" before the desired show is broadcast, or both. The routine is then exited at step 740.

If at step 730, a determination is made that the program to be recorded is in progress, then the routine advances to step 745 where the user is offered the choice via the on-screen display or by other means of either recording the remaining portion of the program being broadcast or scheduling the tuning and recording of the program at a later occurrence so that the program can be recorded in its entirety. In one exemplary embodiment, the later occurrence of the desired program is the next immediate occurrence of the program.

The user may employ, for example, remote control unit 450R to make a selection, wherein such selection can be made by means of pressing a single control button thereon. The routine then advances to step 750 where the record commands are transmitted to the VCR to record the program and the routine is then exited at step 740.

If, however, at step 730 it is determined that the program to be recorded is not in progress, then the routine advances to step 750 where the record commands are transmitted to the VCR to record the program and the routine is then exited at step 740.

In addition, as shown in step 760 and described previously, a user may also select a program from the program guide directly for recording by using, for example, selection and record keys on a user remote control 450R. It will then be determined whether this program is already in progress at step 730, and be processed through the steps as described above.

Although the invention was described with reference to a satellite television system, it is equally applicable to ground based television broadcast systems, both digital and analog.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

I claim:

1. A method for processing for recording a program listed in a program guide, comprising the steps of:
   receiving, by a video apparatus, program data;
   receiving, by the video apparatus, selection of the program;
   receiving, by the video apparatus, a request for recording of the selected program, during a display of the program guide; and
   determining, by the video apparatus, whether the selected program is already in progress, and if the selected program is already in progress, displaying a menu providing a first choice to record a later occurrence of the selected program so that the entire selected program may be recorded and a second choice to record a remaining portion of the selected program in progress.

2. The method of claim 1 further comprising the step of generating, by the video apparatus, a reminder message reminding a user to record the selected program if the request for recording has not been received.

3. The method of claim 1 further comprising the step of searching the program data for the later occurrence of the selected program.

4. The method of claim 1 further comprising the step of providing a warning that that selected program is already in progress.

5. The method of claim 1, wherein the later occurrence of the selected program is the next immediate occurrence of the selected program.

6. A system for processing program data for recording a program listed in a program guide, comprising:
   means for receiving program data;
   means for displaying the program guide and a menu;
   means for receiving selection of the program and a request for recording of the selected program during a display of the program guide; and
   means for determining whether the selected program is already in progress, wherein if the selected program is already in progress, the displaying means displays the menu providing a first choice to record a later occurrence of the selected program so that the entire selected program may be recorded and a second choice to record a remaining portion of the selected program.

7. The system of claim 6 further comprising means for generating a reminder message reminding a user to record the selected program, wherein if the means for receiving selection of the program and the request for recording has not received the request for recording the selected program, the generating means generates the reminder message.

8. The system of claim 6 wherein the means for determining further searching the program data for the later occurrence of the selected program.

9. The system of claim 6 wherein the means for determining further providing a warning that the selected program is already in progress.

10. The system of claim 6, wherein the later occurrence of the selected program is the next immediate occurrence of the selected program.

11. In a video apparatus in which at least program data for programs is received to form a channel guide, a method for recording a program listed in the channel guide, the method comprising the steps of:
    receiving a user search request;
    performing a search of said program data for a match to said user search request;
    determining, if the matched program data is found, whether a record request has been entered and whether a first program associated with said found program data is in progress;
    if said first program is already in progress and the record request has been entered, displaying a menu offering a first choice to record a later occurrence of the first program so that the entire first program may be recorded and a second choice to record a remaining portion of the first program in progress.

12. The method of claim 11 further comprising the step of generating a reminder message reminding a user to record the first program if the record request has not been entered.

13. The method of claim 11 further comprising the step of searching the program data for the later occurrence of the first program.

14. The method of claim 11 further comprising the step of providing a warning that the first program is already in progress.

15. The method of claim 11, wherein the later occurrence of the first program is the next immediate occurrence of the first program.

* * * * *